United States Patent [19]

Beichter et al.

[11] Patent Number: 5,422,836

[45] Date of Patent: Jun. 6, 1995

[54] CIRCUIT ARRANGEMENT FOR CALCULATING MATRIX OPERATIONS IN SIGNAL PROCESSING

[75] Inventors: Jörg Beichter; Ulrich Ramacher, both of München, Germany

[73] Assignee: Siemens Aktiengesellschaft, Munich, Germany

[21] Appl. No.: 50,103

[22] PCT Filed: Nov. 4, 1991

[86] PCT No.: PCT/DE91/00858

§ 371 Date: May 7, 1993

§ 102(e) Date: May 7, 1993

[87] PCT Pub. No.: WO92/09040

PCT Pub. Date: May 29, 1992

[30] Foreign Application Priority Data

Nov. 15, 1990 [DE] Germany .................. 40 36 455.0

[51] Int. Cl.⁶ ............................................ G06F 15/347
[52] U.S. Cl. .................................. 364/736; 364/754
[58] Field of Search .................. 364/736, 736.5, 754

[56] References Cited

U.S. PATENT DOCUMENTS

| | | | |
|---|---|---|---|
| 4,611,305 | 7/1986 | Iwase | 364/736 |
| 4,815,019 | 3/1989 | Bosshart | 364/736.5 |
| 4,949,292 | 8/1990 | Hoshino et al. | 364/736 |
| 4,958,312 | 9/1990 | Ang et al. | 364/754 |
| 5,175,702 | 12/1992 | Beraud et al. | 364/736 |
| 5,179,531 | 1/1993 | Yamaki | 364/736 |

FOREIGN PATENT DOCUMENTS 3735654 6/1988 Germany .
2226899 7/1990 United Kingdom .

OTHER PUBLICATIONS

"Multiplizierer und Akkumulator U 1520 PC 001", by B. Schönfelder et al, vol. 37, No. 10, (1988), Berlin, pp. 626–630.

"A Systolic/Cellular Computer Architecture For Linear Algebraic Operations", by J. G. Nash, Proceedings of the 1985 IEEE Int. Conf. on Robotics & Automation, IEEE Computer Society Press, New York, Mar. 25, 1985, St. Louis Mo., pp. 779–784.

"Programmable Architectures For Matrix & Signal Processing", by Brad Hamilton, Proceedings of IEEE Region 5 Conf. Spanning the Peaks of Electrotechnology, IEEE Computer Society Press, New York, Mar. 21, 1988, pp. 116–126.

"The Matrix Transform Chip", by S. K. Rao, Proceedings of 1989 IEEE Int. Conf. On Computer Design: VLSI In Computers & Processors; IEEE Computer Society Press, New York, Oct. 2, 1989, Cambridge, Mass., pp. 86–89.

"Vector Reduction Methods For Arithmetic Pipelines", by L. M. Ni et al, Proceedings of the 6th Symposium on Computer Arithmetic, IEEE Computer Society Press, New York, Jun. 20, 1983, pp. 144–150.

"Design of A 1st Generation Neurocomputer", edited by U. Ramacher et al, VLSI Design of Neural Networks, Kluwer Academic Publishers, Nov. 1990, 40 pages.

Primary Examiner—David H. Malzann
Attorney, Agent, or Firm—Hill, Steadman & Simpson

[57] ABSTRACT

Circuit arrangement for calculating matrix operations, such as those which recur frequently in signal processing, specifically in conjunction with neural networks, having a systolic array of multipliers and adders, downstream from which a recursive accumulator is connected. In addition to products, sums and differences of matrices, this circuit arrangement also allows squares, absolute magnitudes of sums and differences and squares of sums and differences of two matrices to be calculated very efficiently. Furthermore, with the aid of the recursive accumulator, it is possible to transpose matrices, to calculate row sums and column sums, and to search for minimum or maximum matrix elements.

6 Claims, 4 Drawing Sheets

FIG 4 o = Latch

CIRCUIT ARRANGEMENT FOR CALCULATING MATRIX OPERATIONS IN SIGNAL PROCESSING

BACKGROUND OF THE INVENTION

The invention relates to a circuit arrangement for calculating matrix operations which recur frequently, such as those in signal processing, especially in the context of neural networks. Since the computation operations which are required for calculating neural networks can be reduced to a comprehensible number of elementary matrix operations, it is sensible from the point of view of the necessary high computation speed in the execution of these operations to implement such computation operations in hardware, rather than to carry them out with the aid of software.

A prior art which is closest to the invention is reproduced in the publication by U. Ramacher, "Design of a first Generation Neurocomputer", VLSI Design of Neural Networks, edited by U. Ramacher, U. Rückert, Kluwer Academic Publishers, Nov. 1990. This publication describes a circuit arrangement which is constructed from a systolic arrangement of multipliers and adders. This systolic arrangement makes it possible to calculate matrix products, the matrices which are to be multiplied being split into blocks of size $4 \times 4$, and it being possible to multiply submatrices of this size with the aid of the systolic arrangement in each case. The computation operations which can be carried out using this circuit arrangement are suitable for the calculation of specific neural network types, for example multilayer perceptron networks with feedback.

The disadvantages of this circuit arrangement, as it is described in the publication by U. Ramacher 1990, are primarily that:

the transposition, addition and subtraction are not supported by matrices, result matrices cannot be squared or cannot be multiplied by a scalar, and that the calculation of row and column sums and the search for extreme matrix elements are not supported by this circuit arrangement.

Furthermore, in the case of this circuit arrangement, there is no monitoring of the value range of the matrix coefficients, and the value ranges of the matrix elements are not limited if an overflow occurs.

SUMMARY OF THE INVENTION

The object on which the invention is based is to specify a circuit arrangement by means of which the described disadvantages of the prior art are overcome, and which supports the calculation of matrix products and the multiplication of matrix products by scalars, as well as the squaring of matrix products, sums and different formation of matrices, the multiplication of matrix sums and matrix differences by scalars, forming the magnitude of matrix sums and matrix differences, squaring matrix sums and matrix differences, transposition of matrices and matrix products, the calculation of row and column sums of matrices, and the search for extreme, that is to say minimum and maximum, matrix elements. This object is achieved by means of a circuit arrangement for calculating matrix operations, having a matrix multiplier and a recursive accumulator, which is connected downstream from this matrix multiplier, and having the following features:

the matrices which are to be processed by the circuit arrangement are partitioned into $k \times k$ submatrices;

the overall circuit has first and second inputs, one output and one input/output;

the matrix multiplier has the following units:

dual-port first and second memory units for the storage and transposition of input submatrices, the first memory unit being connected to the first input and the second memory unit being connected to the input/output, and the first memory unit having k independent memories;

a systolic arrangement, which is connected to the first and second memory units via inputs which are controlled by control signals, which arrangement has k multipliers and k downstream-connected adders for the multiplication and addition/subtraction of input submatrices, the first memory unit storing the rows of the submatrix in k separate sub-memory units, and supplying this data via k separate supply lines to the multipliers, so that each multiplier, with the downstream-connected adder successively, and in a synchronized manner, carries out a multiplication of a matrix element from the corresponding row of the first memory unit with the matrix element of a row of the submatrix from the second memory element, and the results are accumulated, via the adder chain which has the k adders of the matrix multiplier, to form product sums;

a first final adder of the carry-select type is in this case provided at the end of this adder chain, and the recursive accumulator has the following units:

third and fourth memory units, both of which are connected to the second input, the third memory unit storing the weightings and the fourth memory unit storing the coefficients;

a further multiplier for the multiplication of the product sums in the first final adder by the coefficients or for squaring the product sums, which further multiplier is connected at a second input either to the output of the first final adder or to the output of the fourth memory unit;

a further adder, which is connected downstream from the further multiplier, for the component-based addition of product sums with the weightings from the third memory;

a second final adder, which is connected downstream from the further adder and is of the carry-select type, and a recursive loop via the further adder, the second final adder or a comparator, a shifter and an overflow-monitoring circuit, as well as via the third memory unit for component-based MIN/MAX comparison of the result submatrices with a submatrix which is present at the third input, and for overflow regulation of the weightings which are stored in the third memory unit.

A systolic arrangement of multipliers and adders is likewise provided in the circuit arrangement according to the invention. In contrast to the circuit arrangement known from the prior art, in the circuit arrangement according to the invention, a recurslye accumulator is connected downstream from this systolic arrangement of multipliers and adders. It is possible to carry out a considerably more comprehensive class of computation operations with the aid of this recursive accumulator. In particular, using the circuit arrangement according to the invention, it is possible to multiply matrix products by scalars, to square matrices or matrix products, to form sums or differences of matrices and to multiply by scalars, to calculate the absolute magnitude of matrix sums and matrix differences and their squares, and to transpose matrices. Furthermore, the circuit arrangement according to the invention allows the calculation of row and column sums of matrices and matrix products and sums or differences of matrices. Finally, this circuit arrangement makes it possible to search for maximum and minimum matrix elements in previously calculated matrices. The present invention is also a circuit arrangement for calculating transpositions, row sums and column sums of matrices and for searching for extreme matrix elements, which has a multiplier and an adder which is connected downstream from this multiplier and links the output of the multiplier to an output of this circuit arrangement, in a recursive manner.

The present invention is further a circuit arrangement for calculating matrix operations, which has a matrix multiplier and a recursive accumulator, which is connected downstream from the matrix multiplier, for calculating transpositions, row sums and column sums and for searching for extreme matrix elements. The accumulator has a multiplier and an adder, which is connected downstream from this multiplier and links the output of the multiplier to an output of this circuit arrangement, in a recursive manner.

Advantageous developments of the present invention are as follows. The matrix multiplier has two dual-port memory units and a systolic chain of multipliers and adders, this chain being connected downstream from these memory units.

The adders of the systolic chain are of the carry-save type.

The matrix multiplier has a systolic chain of multipliers and adders, at whose end a first final adder of the carry-select type is provided.

The recursive accumulator has a second final adder which is connected downstream from the adder and is of the carry-select type.

The recursive accumulator has a comparator which compares the result of the adder with zero.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

The FIGS. 4, 5, 6 and 7 show signal-flow diagrams for driving memory units B1, B2, B3 and B4.

Figure 1:
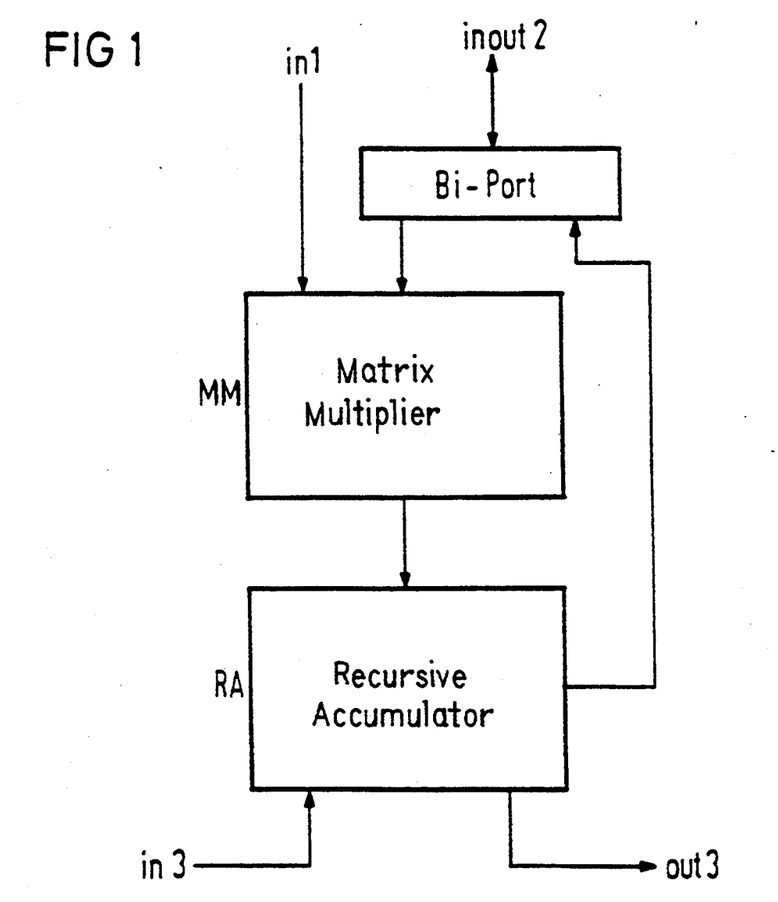
FIG. 1 shows a signal-flow diagram of a circuit arrangement for calculating matrix operations.

As FIG. 1 shows, the circuit arrangement according to the invention comprises two sub-circuits which are designated as a matrix multiplier MM and as a recursive accumulator KA respectively. The overall circuit has two inputs, which are designated by in1 and in3 respectively, an output which is designated by out3, and a bidirectional interface which is designated by inout2. The bidirectional interface can be monitored with the aid of the signal Port2c (see FIG. 2). The coefficients of two matrices which are to be multiplied with one another are supplied via the interfaces in1 and inout2 respectively and the memories B1 and B2 respectively, connected thereto, to a systolic arrangement comprising four multipliers and four adders. The input data of the multipliers of the systolic arrangement are in this case selected with the aid of the switch S1, which is controlled via the signal SEN1. The adder chain of the systolic arrangement is connected to the output of an EXOR gate whose first input is connected to the memory B2 via the switch S2, which is controlled with the aid of the signal SEN2. The other inputs of the multipliers are connected to the memory B1. This memory is a combination of four independent memories which in each case comprise two-times four words. Latches are provided in all cases for buffer storage of data and computation results in the systolic arrangement and in the overall circuit. The latches do not carry out any computational functions but ensure merely the synchronous sequencing of the overall circuit, and are required in order to implement algorithmically dependent time delays. Located at the end of the adder chain of the systolic arrangement is a final adder Fin1, which combines the carry digits of the carry-save adders, which are designated by Add, into the carry-select format. A preferred embodiment of the multipliers within the systolic arrangement is described in the work by U. Ramacher, 1990.

Figure 2:
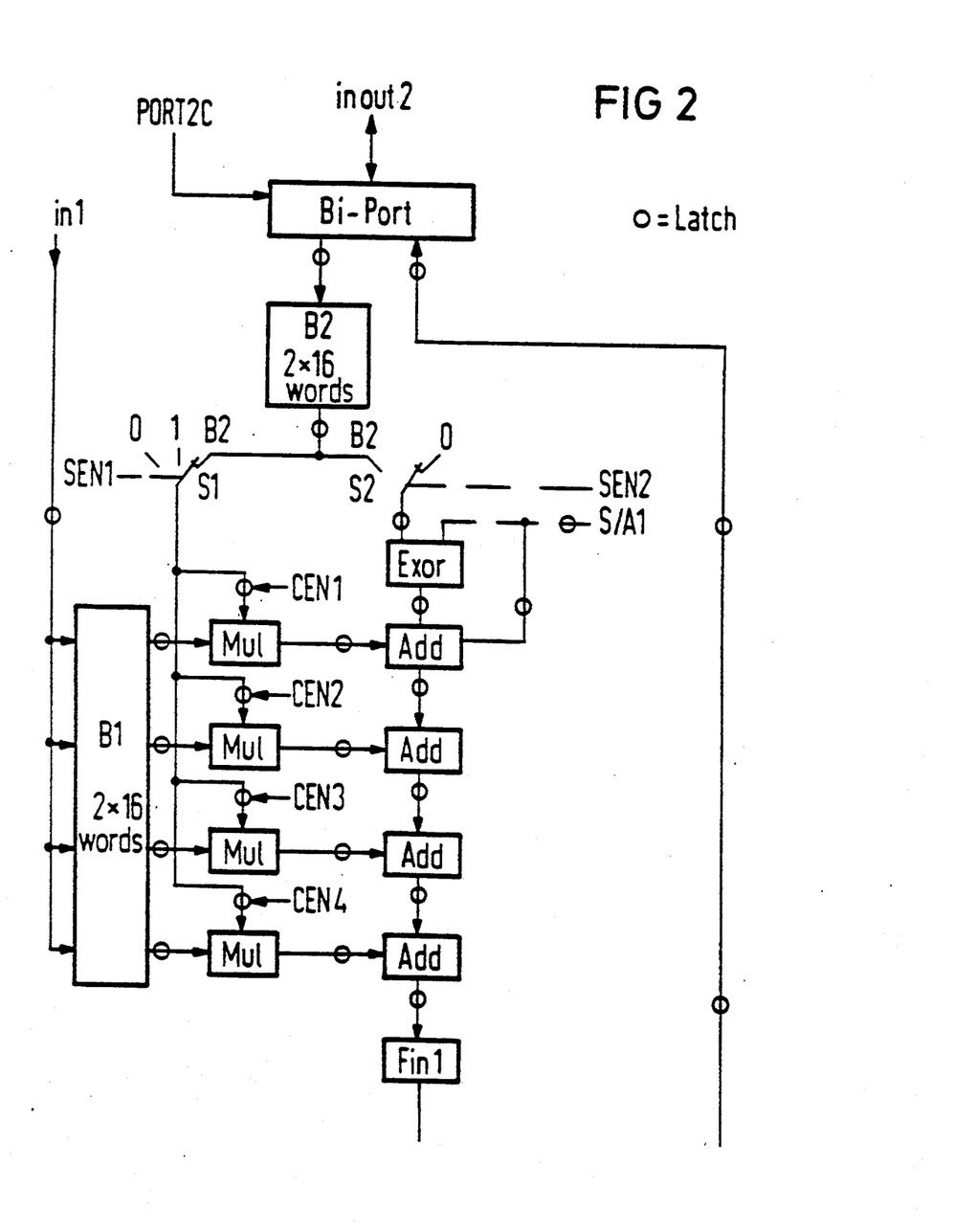
FIG. 2 shows a preferred implementation of a sub-circuit of the circuit from FIG. 1, which is designated, in FIG. 1, as a matrix multiplier.
Figure 3:
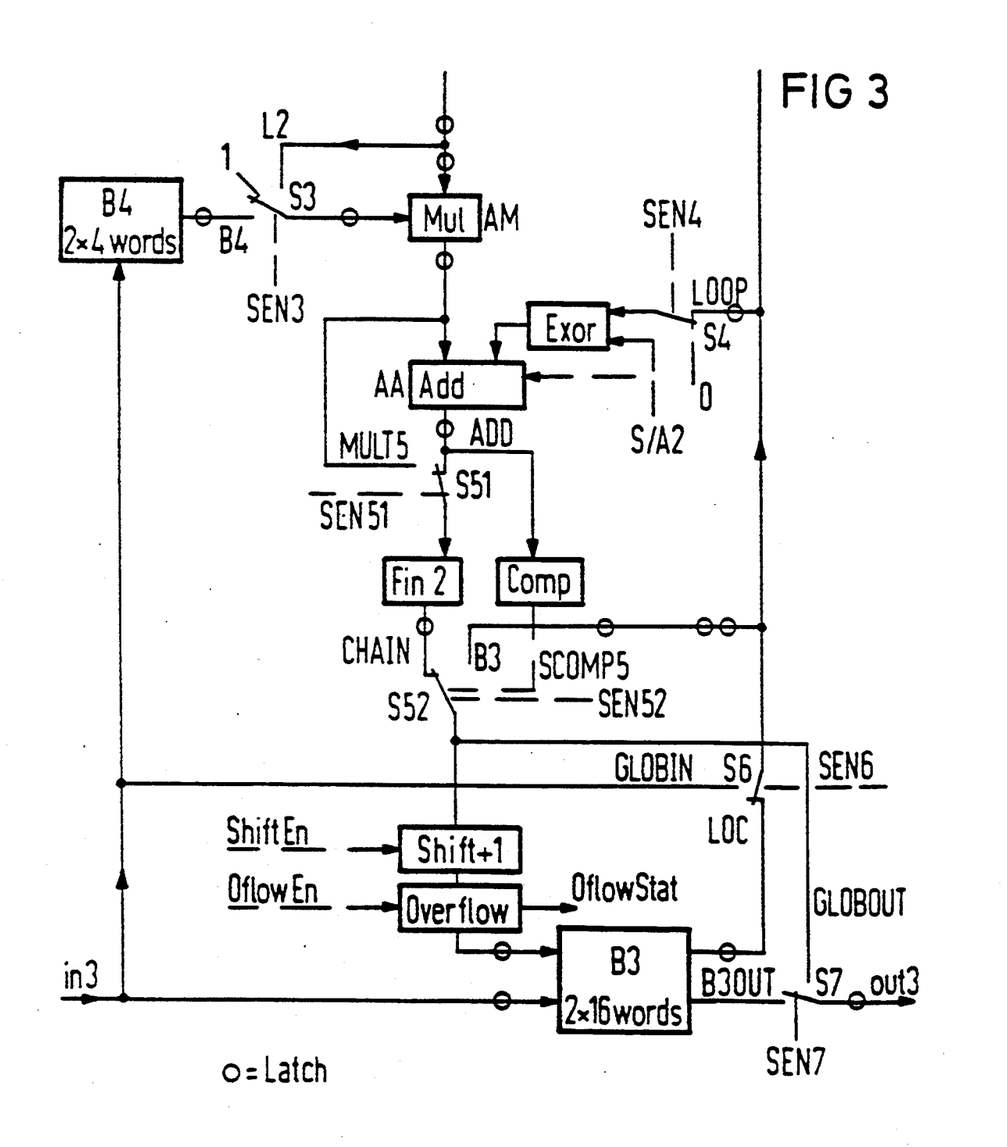
FIG. 3 shows a preferred implementation of a sub-circuit of the circuit arrangement from FIG. 1, which is designated, in FIG. 1, as a recursive accumulator.
Figure 4:
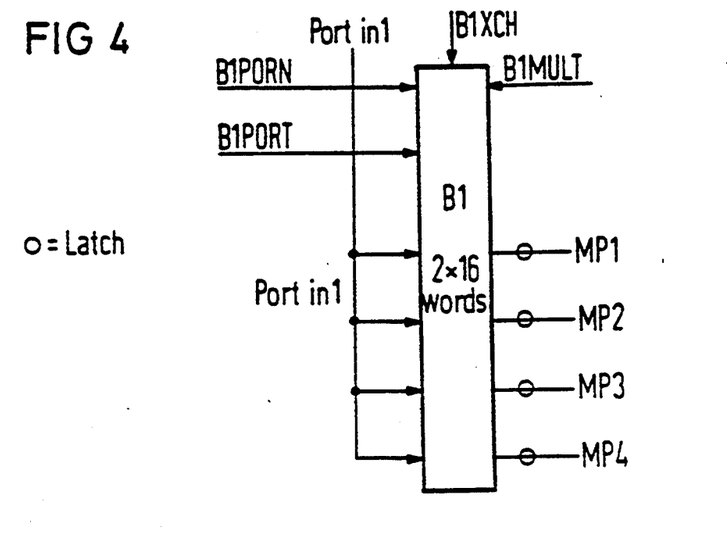
Figure 5:
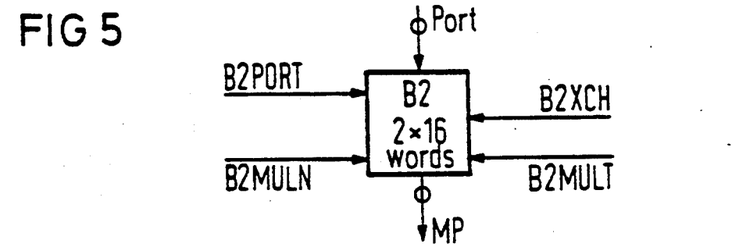
Figure 6:
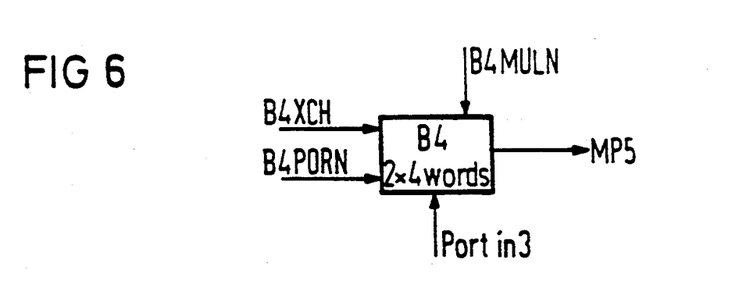
Figure 7:
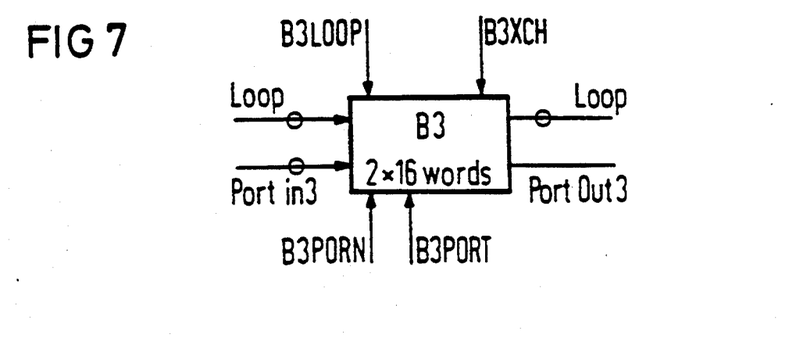

A recursive accumulator, which is shown in FIG. 3, is connected in the overall circuit to the matrix multiplier which is shown in FIG. 1 and is described in more detail in FIG. 2 (see FIG. 1). A multiplier AM, downstream from which an adder AA is connected, is located at the input of this recursive accumulator. One input of this multiplier is connected to the output of the final adder of the matrix multiplier. The second input of the multiplier can be connected to the output of the memory B4 or to the output of the final adder, or can have the constant value 1 depending on the position of the switch S3, which is controlled via the signal SEN3. The second input of the adder AA which is connected downstream from this multiplier is connected to the output of a second EXOR gate. One input of this second EXOR gate is connected to the signal LOOP via the switch S4 which is controlled via the signal SEN4. This signal LOOP is identical to the signal at the input in3 or to the output of the memory B3, depending on the position of the switch S6, which is controlled via the signal SEN6. The output of the memory B3 is also designated as LOC in FIG. 3. The output of the adder AA is connected to a second final adder Fin2 via the switch S51 which is controlled via the signal SEN 51. Connected in parallel with this final adder Fin2 is a comparator Comp which compares the output of the adder AA with 0 and hence acts as a mathematical-sign decision element. This mathematical-sign signal, together with the control signal SEN52, determines the position of the switch S52 which, depending on the switch position, connects the output signal, which is designated by CHAIN, of the final adder Fin2 or the loop signal, which is designated by B3 and is delayed via three latches, to a shifter which is controlled by the signal ShiftEn. The output of the shifter is connected to an overflow control circuit Overflow, whose output is connected to the memory unit B3.

The signal path via the adder AA, the final adder Fin2 or the comparator Comp, the shifter and the overflow control circuit, as well as via the memory unit B3 and the EXOR gate whose output forms the second input of the adder AA, represents a recursive loop by means of which the computation operations which are novel in comparison with the prior art can be carried out.

In contrast to the circuit arrangement which is described in the work by U. Ramacher, 1990, the circuit arrangement according to the invention now also makes possible matrix addition and component-based min/max comparison, in addition to matrix-matrix multiplication. The input matrices, split into 4×4 submatrices, are locally transposed and are then added or multiplied. The components of the result matrix can optionally be squared or multiplied by a scalar. Either a global accumulation or a min/max comparison in the row or column direction can be applied to the 4×4 submatrices produced in this way.

The value range of the 16-bit weighting values are monitored for an overflow and, if an overflow occurs, the value is automatically limited. Using a special shift device, the value range of the weightings can be objectively changed, for example halved or doubled in steps, in order thus to avoid an overflow and to utilize the 16-bit word width of the weighting memory more effectively.

The development of the circuit arrangement according to the invention for calculating matrix operations is based on the idea of distributing the overall computation work between a predetermined number of elementary circuit arrangements, and of partitioning the large matrices which are to be multiplied or added into 4×4 submatrices. Each elementary circuit arrangement thus processes only a specific row and column region (submatrices) of the matrix which is held in local memories. The calculation of large matrices is combined from the processing of the 4×4 submatrices. During this combination, the indices of the submatrices are expanded to the overall effective ranges of the large matrices. Operations which achieve the solution for large matrices from the calculation of submatrices are local and global accumulation and local or global min/max comparison of the components.

The circuit arrangement according to the invention carries out the following simple computation operations which, linked in different ways, implement the neural algorithms. In this case, the term submatrix is used to designate 4×4 matrix blocks which are produced by partitioning large matrices.

1. Multiplication of input submatrices
   1.1 Submatrix A (in the memory B1) multiplied by submatrix B in the memory (B2);
   1.2 Submatrix A (in the memory B1) multiplied by the unit matrix;
2. Addition/subtraction of input submatrices
   2.1 Submatrix B (in the memory B2) is added to the submatrix A (in the memory B1), previously multiplied by the unit matrix;
   2.2 Submatrix B (in the memory B2) is subtracted from submatrix A (in the memory B1), previously multiplied by the unit matrix;
   2.3 Submatrix B (in the memory B2) pass [sic] through the adder chain, no addition;
3. Multiplication of the result submatrices from 1.1 to 2.2.
   3.1 Multiplication of the result submatrix by a coefficient (a dedicated coefficient for each submatrix column).
   3.2 No multiplication (multiplication by 1).
   3.3 Multiplication of the individual submatrix components by themselves (squaring).
4. Addition/accumulation of result submatrices from 3.1 to 3.3.
   4.1 Addition of the result submatrix to the submatrix which is stored in the memory unit B3 (local accumulation).
   4.2 Addition of the result submatrix to the submatrix which is applied to the input in3 at the same time (distributed accumulation).
5. Component-based min/max comparison for the result submatrix from 3.1 to 3.3.
   5.1 Min/max comparison between the results from 3.1 to 3.3 and the submatrix stored in the memory unit B3.
   5.2 Min/max comparison between the submatrix from 3.1 to 3.3 and a submatrix which is applied to the input in3 at the same time.
6. Overflow regulation of the weightings which are stored in the memory unit B3.
   6.1 Overflow recognition and value saturation of the weightings which are to be limited to 16 bits.
   6.2 Controlled, global reformatting of all weighting submatrices.

The computation operations 1.1 to 6.2 which are implemented in the circuit arrangement are carried out in different parts of the overall circuit and can be connected to one another in specific combinations in order to support different neural algorithms.

The following can be combined:
in each case one operation 1.1 to 2.2 with
in each case one operation 3.1 to 3.3 and
in each case one operation 4.1 to 5.2.
The two operations 6.1 and 6.2 can be combined with 4.1.

The execution of the individual computation operations with the aid of the circuit arrangement, and the control of the circuit arrangement are described in detail in the following text.

Computation operation 1.1: submatrix in the memory B1 multiplied by the submatrix in the memory B2.

The two matrices A and B are loaded into the memories B1 and B2. Switch S1 is in the position B2, switch S2 is in the position 0 and the signal S/A1 has the value 0. The memory B2 supplies the data B (1,1), B (2,1), ..., B (4,4), that is to say the matrix elements of the left, top 4×4 submatrix of the matrix B, in a distributed manner with each clock cycle over 16 clock cycles. The control signals CEN1, ..., CEN4 at the input registers of the multipliers have the values 0 and are thus not active except at the following times: in clock cycle 1, CEN1 is active and causes the loading of the input register of the uppermost multiplier with the matrix element B (1,1). In the next clock cycle, CEN2 is active and loads the input of the second multiplier with the matrix element B (2,1). In the third and fourth clock cycles, the input registers of the other two multipliers are loaded with CEN3 and CEN4. In the fifth clock cycle, CEN1 is active again and loads the matrix element B (1,2) in the first multiplier. This distribution process continues cyclically and ends after the 16th clock cycle when the matrix element B (4,4) is loaded into the fourth multiplier by means of CEN4=active.

In parallel with this process, the memory unit B1 holds the submatrix A (1,1), ..., A (4,4) in a column-based manner in four separate sub-memory units and supplies these data via four separate supply lines to the multipliers of the systolic arrangement (see FIG. 2). The first multiplier receives its first matrix element A (1,1) from the memory B1 at the same time as the matrix element B (1,1). In the three subsequent clock cycles, the memory B1 supplies the matrix elements A (2,1), A (3,1) and A (4,1) via the same line. Between the fifth and eighth clock cycles, when the matrix element B (1,2) is also loaded at the multiplier, the application to the matrix elements A (1,1), ..., A (4,1) is repeated. After 16 clock cycles, that is to say once the sequence of the matrix elements A (1,1), ..., A (4,1) has been applied to the multipliers of the systolic arrangement four times, the reading for the first multiplier of the chain is completed. The second multiplier receives the matrix elements A (1,2) ..., A (4,2) from the memory B1. The third and the fourth multipliers respectively receive the matrix elements A (1,3), ..., A (4,3) and A (1,4), ..., A (4,4) respectively from the memory B1 with in each case one further clock cycle delay. Overall, a delay of three clock cycles results between the first and the fourth multipliers of the chain. In consequence, the last multiplier receives the value of the matrix element A (4,4) for the fourth and last time in the 19th clock cycle.

Each multiplier can start one multiplication of two matrix elements of the matrices A or B respectively per clock cycle. Such a multiplication lasts for seven clock cycles. The accumulation of the results is accomplished via the adder chain of the matrix multiplier in FIG. 2. In clock cycle 8, the uppermost, first adder receives the product A (1,1) . B (1,1) of the first multiplier, adds the zero from switch S2 thereto and passes the result to the subsequent second adder, in the following clock cycle (clock cycle 9). At the same time as it receives the sum of the first adder from the second multiplier, said second adder receives the product B (1,2) . A (2,1) which it adds to the sum (clock cycle 10). The products B (1,3) . A (3,1) and B (1,4) . A (4,1) are also added in the following two clock cycles. In clock cycle 12, the sum of the four products of the matrix elements of the first row of the submatrix A and the first column of the submatrix B are present at the output of the fourth and final adder. The sums which are still missing are added in the further clock cycles. The overall result matrix is completely calculated when the sum of the products of the matrix elements of the fourth row of the matrix A and the matrix elements of the fourth column of the matrix B appears at the output of the adder chain, in the 28th clock cycle.

Computation operation 1.2: submatrix in the memory B1 multiplied by the unit matrix (no multiplication).

The computation operation 1.2 runs in an analogous manner to the computation operation 1.1, the second matrix B being replaced by the unit matrix. The switch S1 is switched cyclically between the value 1 and the value 0 for this purpose. S1 is at 1 in clock cycles 1, 6, 11 and 16, and is at 0 in all the other clock cycles.

Computation operation 2.1: submatrix in the memory B2 added to the submatrix in the memory B1.

In order to carry out the computation operation 2.1, the computation operation 1.2, which causes a multiplication of the matrix A which is present in the memory B1, by the unit matrix, is expanded by the addition of a matrix B which is present in the memory B2. In this case, the switch S2 is in the position B2. The control signal S/A1 has the value zero. All the other steps correspond to those in the computation operation 1.2.

Computation operation 2.2: Submatrix in the memory B2 subtracted from the submatrix in the memory B1.

In this case, the sequence is completely analogous to the sequence during the computation operation 2.1. Only a change in the mathematical sign is required, which is carried out by the signal S/A1 being given the value 1. In consequence, the EXOR gate together with the adder connected downstream from it forms the two's-complement of the data which are present in the memory B2.

Computation operation 2.3: Loading the data which are present in the memory B2 into the recursive accumulator without addition, that is to say circumventing the systolic adder chain.

The computation operation 2.3 is carried out in an analogous manner to the computation operation 2.1, a zero matrix being supplied, however, instead of a unit matrix. This is done by the switch S1 being in the position zero during all the clock cycles.

Computation operation 3.1: Multiplication of a result submatrix by a coefficient.

In the case of this computation operation, the systolic adder chain supplies the sums, which are mentioned in the description of the computation operation 1.1, of the products from the matrix elements of the lines of matrix A by the columns of matrix B, to be precise in the sequence such that the sum of the products from the matrix elements of the first line of matrix A and the matrix elements of the first column of the matrix B is calculated first, and the sum of the products from the matrix elements of the fourth row of the matrix A and the fourth column of the matrix B is calculated last, starting from the 27th clock cycle. The upper 19 bits of the data are present in the carry-save form and must be converted into the binary form (final adder Fin1) before they can be supplied as input data to the first multiplier AM of the recursive accumulator. At the same time, a delay of one clock cycle is produced by the final adder Fin1. Two further clock cycles are produced to provide the data at both inputs of the multiplier AM.

The sums of the products of matrix elements coming from the final adder Fin1 arrive at the multiplier AM in the sequence described above, and are multiplied by the coefficients K(1), K(2), K(3) and K(4), which are stored in the memory B4. In this case, the following products are formed in series:

$$X(1) . P(1,1), K(1) . P(2,1), K(1) . P(3,1), K(1) . P(4,1),$$
$$K(2) . P(1,2), K(2) . P(2,2), ..., K(4) . P(4,4).$$

In this case, the product P(i,J) is equal to the sum of the products of the matrix elements in the i-th row of the matrix A and the matrix elements in the k-th column of the matrix B. The multiplier requires seven clock cycles, a new multiplication being started in each clock cycle. The results appear at the output of the multiplier AM from the 21st to the 37th clock cycles. In this case, the switch S3 is always in position B4. Computation operation 3.2: No multiplication.

The switch S3 is in the position 1, as a result of which the value 1 is allocated to all the coefficients K(i) for i =1, ..., 4. The remaining sequence is identical to the computation operation 3.1.

Computation operation 3.3: Squaring of the matrix components.

The switch S3 is in the position L2. The values P(i,j) coming from the adder chain are applied to both inputs of the multiplier AM. The multiplicand word and the multiplier word are thus identical. If all the other steps are carried out in an analogous manner to computation operation 3.1, then the product sums P(i,J) appear in the position of the coefficients K(i) and the product matrix is multiplied by itself. In accordance with the computation operation 1.2, the product matrix can, preferably also be one of the original matrices.

Computation operation 4.1.1: Local accumulation of the matrix from 3.1 to 3.3

The product sums P(1,1), P(2,1), ..., P(4,4) coming from the adder chain of the matrix multiplier are added in a component-based manner to the data S(1,1), S(2,1), ..., S(4,4) which are stored in the memory B3. The new values of S(i,J) which thus result are subsequently stored in the memory B3 again (fetch and add).

In this case, the switch S4 is in the position LOOP, the switch S51 is in the position ADD, the switch S52 is in the position CHAIN, and the switch S6 is in the position LOC. The control signal S/A2 has the value zero here, the control signals ShiftEn and OflowEn (see FIG. 3) both being set to zero initially, here. The data S(1,1), S(2,1), ..., S(4,4) are read in this sequence out of the part of the memory B3 which is connected to the recursive loop. Said data are passed via the switches S6 and S4 and the EXOR gate to the adder AA, which is constructed from a series of full-adders. In clock cycle 22, S(1,1) is added to P(1,1), and S(2,1) is added to P(2,1) in the following clock cycle.

The carry word and sum word are linked in the downstream-connected final adder Fin2 to form a single binary value. The 50-bit-wide final adder Fin2 is a complex circuit having a long delay time, as a result of which, if possible, it is implemented at only one point and not after every adder stage. The delay time in the final adder Fin2 is two clock-cycle periods.

The results, the new values S(1,1), ..., S(4,4), are passed via the switch S52 to the shifter. If the value of the signal ShiftEn is zero, then the data remain unchanged. If OflowEn=0, the downstream-connected overflow controller also has no effect on the data. Six clock cycles after the old values of S(i,J) have been read out of the memory B3, the new values of S(i,J) are written in.

Computation operation 4.1.2: Local accumulation: Resetting of the recursive loop.

A zero is added to the product sums P(i,J) in each case, instead of the old values S(i,J). In this case, the switch S4 is at zero. The remaining sequence is the same as in the computation operation 4.1.1.

Computation operation 4.2: Distributed accumulation of the matrix from 3.1 to 3.3.

The switch S4 is in the position LOOP, the switch S51 is in the position ADD, the switch S52 is in the position CHAIN, and the switch S6 is in the position GLOBIN. In contrast to the operation 4.1.1, the old values of S(1,1), ..., S(4,4) are not read out of the memory B3 but are taken from the input in3. The accumulation passes via the switches S6 and S4 and the adders AA and Fin2 as well as the switches S51 and S52. After the switch S52, the results, the new values S(1,1), ..., S(4,4), are not written via the shifter into the memory B3 but are passed directly to the output out3 via the switch S7. A delay time of five clock cycles is required for this purpose.

Computation operation 5.1: Component-based min/-max comparison of the result submatrix from 3.1 to 3.3 with the submatrix which is stored in the part of the memory B3 which belongs to the recursive loop.

The switch S4 is in the position LOOP, and the switch S6 is in the position LOC. The signal S/A2 has the value 1 and the EXOR gate and the downstream-connected adder stage AA are used to form the two's complement of the data passing via the switch S4. The switch S51 is in the position MULT5 and the position of the switch S52 is produced from the result of the comparator Comp, which tests whether the result of the adder AA is greater than or equal to zero. The adder determines the difference between the value originating from the multiplier AM and the value of the memory B3. If this difference is positive, the comparator positions the switch S52 into the position MULT5 during MAX comparison, and into the position ADD during MIN comparison. If, in contrast, the calculated difference is negative, then the value from the memory B3 is greater than the product at the output of the multiplier AM, and the switch positions are interchanged. The result which is selected via the switch S52 is stored in the memory B3 without any further change.

Computation operation 5.2: Component-based MIN/MAX comparison of the result submatrix from 3.1 to 3.3 with the submatrix which is applied to the input in3 at the same time.

In contrast to the computation operation 5.1, the switch S6 is here in the position GLOBIN and the switch S7 is in the position GLOBOUT. All the other steps are analogous to the computation operation 5.1.

Computation operation 6.1: Overflow recognition and value saturation for the 16-bits of data stored in the memory B3 (weightings).

The word length of the weightings in neural networks is usually limited to 16 bits. Overflow recognition and saturation are used to suppress the limits which can be represented being exceeded or undershot during the learning process. The data coming from the switch S52 are tested in the overflow unit for overflow and, possibly, are saturated, if OflowEn=1 is set by the controller (16 bit wordlength). If OflowEn=0, no saturation is carried out and the data path has a 50-bit length. An overflow counter, which can be read by the controller, is incremented whenever an overflow is recognized (OflowStat =1).

Computation operation 6.2: Reformatting the weighting matrices.

Before data are written into the part of the memory B3 which belongs to the recursive loop, they can be shifted by one position to the right or left. The numerical range which can be represented can thus be matched dynamically during the learning process. The drive via the signal ShiftEn takes place from the controller.

The matrix operations which can be carried out with the aid of the circuit arrangement have thus been described. The following text is intended to describe the operations in the memory units B1, ..., B4 comprehensively. These further operations are carried out in the memory units B1, ..., B4 in order to permit simple and effective data transportation between the circuit arrangement and its environment (for example, simultaneous loading, computation and unloading). Furthermore, the matrix components are sorted and, if desired, transposed, for processing in the circuit arrangement. The individual memory units are selected in the manner shown in the signal-flow diagrams in FIGS. 4 to 7.

7. Operations in the matrix memory B1
  7.1.1 Load, not transposed
  7.1.2 Load transposed
  7.2.1 Change in the memory halves
  7.2.2 No change in the memory halves
  7.3 Read the data
8. Operations in the matrix memory B2
  8.1 Load the data
  8.2.1 Change in the memory halves
  8.2.2 No change in the memory halves
  8.3.1 Read, not transposed
  8.3.2 Read, transposed
9. Operations in the matrix memory B3
  9.1 Fetch and add, in the half of the memory B3 belonging to the loop
  9.2.1 Change in the memory halves
  9.2.2 No change in the memory halves
  9.3.1 Load/read in the memory half which belongs to the interface (Port), not transposed
  9.3.2 Load/read in the memory half which belongs to the interface, transposed
10. Operations in the coefficient buffer B4
  10.1 Load the data
  10.2 Read the data
  10.3 Change in the memory halves
11. Control of the bidirectional interface inout2.
  11.1 Interface switched to input
  11.2 Interface switched to output In conjunction with most computation operations, the interface inout2 is used as an input (11.1), and only for short, precisely specified steps is it used as an output (11.2).

The operations in the memory units are described comprehensively in the following text. The terms port-side and loop-side are used for brevity in this description. Port-side is intended to mean a memory half which belongs to the interface, while loop-side means a memory half facing the recursive loop.

The data A(i,J) are supplied from the exterior via the interface in1 and pass into the memory B1. Their sequence is A(1,1), A(1,2), ..., A(4,4). The memory B1 holds these 16 matrix elements such that the matrix elements A(1,1), ..., A(4,1), that is to say the first column of the 4×4 submatrix of A, are in the top part of the memory and can subsequently be allocated to the multiplier 1. The matrix elements A(1,2), ... A(4,2), that is to say the elements of the second column, are stored in the second memory row for the multiplier 2, etc. The word-line signals are passed systolically from memory word to memory word, using a built-in sequencer, in order to select the memory cells, so that only one memory word is written per clock cycle. The sequencer is triggered by a trigger pulse B1PORN from the controller. Furthermore, B1PORT=0.

7.1.2 Load, transposed

In contrast to 7.1.1, the data are stored in B1 such that the data A(1,1), ..., A(1,4) are stored in the first memory row, and the data A(2,1), ... A(2,4), are stored in the second memory row, etc. A dedicated sequencer, which is triggered by B1PORT (B1PORN=0), is required for the changed sequence.

7.2.1 Change in the memory halves

The allocations of the two halves of the memory unit B1, the one half to the input in 1 (loading), the other half to the multiplier chain (reading), are interchanged. The controller initializes the change in the memory halves via the control bit B1XCH. The signal B1XCH is passed from memory row to memory row in the memory unit B1 with a delay of one clock cycle in order to compensate for the delay time in the adder chain. It is possible to change the allocation of the memory halves only before a submatrix operation, that is to say at the earliest every 16 clock cycles.

7.2.2 No change in the buffer halves

The submatrix stored in B1 is required a plurality of times successively for calculations (learning process). Overwriting of these data is prevented if the change in the memory halves is omitted. The data which are stored on the multiplier side are maintained until the next change in the memory halves. B1XCH does not change its value.

7.3 Read the data

Reading takes place via a sequencer which is triggered via B1MULN. See 1.1 to 2.3 for the sequence for this purpose.

8.1 Load B2

B2 has 16 memory cells. The data B(i,j) are stored in the memory in series. The memory fields are selected by means of a sequencer, B2PORN being used for triggering (see 7.1.1).

8.2.1 Change in the memory halves

The change in the memory halves is controlled by the controller via B2XCH. The change covers all the buffer halves at the same time. A change is possible with every new submatrix operation, at the earliest every 16 clock cycles.

8.2.1 No change in the buffer halves

If the value of B2XCH is maintained, the buffer halves are not changed.

8.3.1 Read, not transposed

The memory cells are read in the same sequence in the other memory half, in parallel with writing: Trigger pulse B2MULN.

8.3.2 Read, transposed

The sequence of the data read corresponds to the transposed matrix: Trigger pulse B2MULT.

9.1 Fetch-and-add in B3, loop-side

For the fetch-and-add operation, the data which are to be written in 9.1 are read from the same memory cells of the memory B3 in which they will subsequently be stored again, 6 clock cycles in advance (trigger: B3LOOP).

9.2.1 Change in the buffer halves

The change is controlled by the controller via B3XCH (see 8.2.1).

9.2.1 No change in the buffer halves

The value of B3XCH is maintained ( see also 8.2.2).

9.3.1 Read, port-side, not transposed

The data located in B3 (port-side) are read in the sequence S (1,1), S (2,1), ..., S (4,4) and are replaced by values which are simultaneously present at the input. The sequencer is triggered by B3PORN.

9.3.2 Read, port-side, transposed

The data located in B3 (port-side) are read in the sequence S (1,1), S (1,2), ..., S (4,4) and are replaced by values which are present at the input of B3 at the same time. The sequencer is triggered by B3PORT.

10.1 Load the data in B4

The data in B4 (coefficients) are supplied to the circuit arrangement via the interface in3 (OUT3). Four clock cycles are required for loading. The trigger pulse for the sequencer is B4PORN.

10.2 Read the data

The trigger pulse for reading is B4MULN.

10.3 Change in the memory halves

Four further memory fields are provided for storage of a second set of coefficients. Selection takes place via B4XCH.

11.1 Interface INOUT2 switched to input.

The input drivers of the interface INOUT2 are always active.

11.2 Interface INOUT2 switched to output.

The changeover of the interface INOUT2 to output operation takes place via an external control bit PORT2C, in order to prevent external driver conflicts.

The circuit arrangement described relates to a circuit module which, connected together with identical circuit modules, produces a coprocessor for carrying out matrix operations. This coprocessor is supplied with the necessary control signals from a controller circuit.

The internal construction of the controller and also of the memory units is described in the diploma thesis by U. Hachmann, "Controller Architektur für einen Neuroemulator in Form eines systolischen Arrays" [Controller architecture for a neural emulator in the form of a systolic array], Department of Electrical Engineering Components, Dortmund University, Dortmund 1990.

Specialist terms which are in normal use and are used herein for designating digital circuits are explained, for example, in Kai Hwang, "Computer Arithmetics Principles, Architecture and Design", John Wiley & Sons, 1979.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for calculating matrix operations of submatrices, comprising:

a matrix multiplier and a recursive accumulator, which is connected downstream from said matrix multiplier;

first and second input terminals, and one input/output terminal;

said matrix multiplier having the following units: dual-port first and second memory units for storage of input submatrices, the first memory unit being connected to the first input terminal and the second memory unit being connected to the input/output terminal, and the first memory unit having k independent memories, where k is a whole number greater than one;

a systolic arrangement, which is connected to the first and second memory units, said systolic arrangement having k multipliers connected to k series-connected adders, respectively, for multiplication and addition/substraction of input submatrices, the first memory unit storing rows of an input submatrix in k separate submemory units, the k multipliers connected via k supply lines, respectively, to the k separate sub-memory units, respectively, means for controlling said k multipliers such that each multiplier, with the associated series-connected adder successively, and in a synchronized manner, carries out a multiplication of a matrix element from a corresponding row of the first memory unit with a matrix element of a row of a submatrix from the second memory element, the k series-connected adders also connected to form an adder chain wherein results of said multiplication of matrix elements are accumulated to form product sums;

a first final adder of a carry-select type connected at an end of said adder chain; and the recursive accumulator having the following units: third and fourth memory units, each of which being connected to the second input terminal, the third memory unit storing weightings and the fourth memory unit storing coefficients;

a further multiplier for at least one of multiplying product sums in the first final adder by the coefficients and squaring the product sums, said further multiplier connected to one of an output of the first final adder and an output of the fourth memory unit;

a further adder, which is connected downstream from the further multiplier, for component-based addition of product sums with the weightings from the third memory;

a second final adder, which is connected downstream from the further adder and is of a carry-select type; and a recursive loop via the further adder, the second final adder or a comparator, a shifter and an overflow-monitoring circuit, and via the third memory unit for component-based MIN/MAX comparison of resulting submatrices with a submatrix which is present at the second input terminal, and for overflow regulation of the weightings which are stored in the third memory unit, said recursive loop formed by an output of the further adder being connected to one of an input of the second final adder and an input of the comparator, an input of the third memory unit being connected via the shifter and the overflow-monitoring circuit to one of an output of the second final adder and an output of the comparator, and an output of the third memory unit being connected to an input of the further adder.

2. A circuit arrangement for calculating matrix operations of submatrices, comprising:

a matrix multiplier and a recursive accumulator, which is connected downstream from said matrix multiplier;

a first input terminal and a third input terminal;

said matrix multiplier having dualport first and second memory units for storage of input submatrices, the first memory unit being connected to the first input terminal and the second memory unit being connected to the third input terminal, and the first memory unit having k independent memories, where k is a whole number greater than one;

said matrix multiplier having a systolic arrangement, which is connected to the first and second memory units, said systolic arrangement having k multipliers connected to k series-connected adders, respectively, for multiplication and addition/subtraction of input submatrices, the first memory unit storing rows of an input submatrix;

said matrix multiplier having means for controlling said k multipliers such that each of said k multipliers, with an associated series-connected adder, successively and in a synchronized manner, carries out a multiplication of a matrix element from a corresponding row of the first memory unit with a matrix element of a column of a submatrix from the second memory element, the k series-connected adders being connected to form an adder chain wherein results of said multiplication of matrix elements are accumulated to form product sums; and said matrix multiplier having a first final adder connected to an end of said adder chain.

3. A circuit arrangement for calculating matrix operations of submatrices, comprising:
   a matrix multiplier and a recursive accumulator, which is connected downstream from said matrix multiplier;
   a first input terminal, a second input terminal, and a third input terminal;
   said matrix multiplier having dualport first and second memory units for storage of input submatrices, the first memory unit being connected to the first input terminal and the second memory unit being connected to the third input terminal, and the first memory unit having k independent memories, where k is a whole number greater than one;
   said matrix multiplier having a systolic arrangement, which is connected to the first and second memory units, said systolic arrangement having k multipliers connected to k series-connected adders, respectively, for multiplication and addition/subtraction of input submatrices, the first memory unit storing rows of an input submatrix;
   said matrix multiplier having means for controlling said k multipliers such that each of said k multipliers, with an associated series-connected adder, successively and in a synchronized manner, carries out a multiplication of a matrix element from a corresponding row of the first memory unit with a matrix element of a column of a submatrix from the second memory element, the k series-connected adders being connected to form an adder chain wherein results of said multiplication of matrix elements are accumulated to form product sums;
   said matrix multiplier having a first final adder connected to an end of said adder chain;
   the recursive accumulator having a third memory unit connected to the second input terminal, the third memory unit storing accumulation results;
   the recursive accumulator having a further adder, which is connected downstream from the first final adder of the matrix multiplier, for component-based addition of said product sums with contents of the third memory;
   the recursive accumulator having a second final adder, which is connected downstream from the further adder, results of the second final adder being stored in the third memory unit; and
   the recursive accumulator having a recursive loop via the further adder, the second final adder and via the third memory unit for component-based accumulation of resulting submatrices and means to perform accumulation with a submatrix which is present at the second input terminal, said recursive loop formed by connection of the further adder to the second final adder, by connection of said second final adder to said third memory unit, and by connection of said third memory unit connected said further adder.

4. The circuit arrangement as claimed in claim 3, wherein said circuit arrangement further comprises;
   a fourth memory unit for storing coefficients, said fourth memory unit being connected to the second input terminal;
   a further multiplier for multiplying product sums in the first final adder by said coefficients, said further multiplier being connected to an output of the first final adder.

5. The circuit arrangement as claimed in claim 3, wherein for a component-based MIN/MAX comparison, said circuit arrangement further comprises:
   a fourth memory unit connected to the second input terminal, the fourth memory unit storing accumulation results; and
   a further multiplier for squaring accumulation results in the first final adder, said further multiplier being connected between an output of the first final adder and an input of the further adder, said further multiplier also connected to said fourth memory unit.

6. The circuit arrangement as claimed in claim 3, wherein said circuit arrangement further comprises:
   a fourth memory unit for storing coefficients, said fourth memory unit being connected to the second input terminal;
   a further multiplier for multiplying product sums in the first final adder by said coefficients, said further multiplier being connected to an output of the fourth memory unit.

* * * * *